(12) United States Patent
Teranishi et al.

(10) Patent No.: US 12,060,466 B2
(45) Date of Patent: Aug. 13, 2024

(54) MOLDING MATERIAL, FIBER-REINFORCED COMPOSITE ARTICLE AND METHOD FOR PRODUCING FIBER-REINFORCED COMPOSITE ARTICLE

(71) Applicant: Mitsubishi Chemical Corporation, Tokyo (JP)

(72) Inventors: Takuya Teranishi, Tokyo (JP); Akira Oota, Tokyo (JP); Masahiro Ichino, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 17/214,502

(22) Filed: Mar. 26, 2021

(65) Prior Publication Data

US 2021/0214511 A1 Jul. 15, 2021

Related U.S. Application Data

(63) Continuation of application No. PCT/JP2019/037237, filed on Sep. 24, 2019.

(30) Foreign Application Priority Data

Oct. 1, 2018 (JP) ................. 2018-186769

(51) Int. Cl.
| | | |
|---|---|---|
| *C08J 5/04* | (2006.01) | |
| *C08G 59/40* | (2006.01) | |
| *C08J 5/24* | (2006.01) | |

(52) U.S. Cl.
CPC .......... *C08J 5/042* (2013.01); *C08G 59/4021* (2013.01); *C08J 5/243* (2021.05); *C08J 5/249* (2021.05); *C08J 2363/02* (2013.01); *C08J 2363/04* (2013.01)

(58) Field of Classification Search
CPC ... C08J 5/042; C08J 5/249; C08J 5/243; C08J 2363/02; C08J 2363/04; C08G 59/4021
USPC .......................................................... 523/400
See application file for complete search history.

(56) References Cited

U.S. PATENT DOCUMENTS

| | | | | |
|---|---|---|---|---|
| 2,794,754 A | * | 6/1957 | Schroeder ............. | D06M 15/39 549/555 |
| 2006/0035088 A1 | | 2/2006 | Takano et al. | |
| 2016/0152822 A1 | | 6/2016 | Bishop et al. | |
| 2017/0226274 A1 | | 8/2017 | Harrington | |
| 2018/0155489 A1 | | 6/2018 | Ushiyama et al. | |

FOREIGN PATENT DOCUMENTS

| | | |
|---|---|---|
| CN | 106398119 A | 2/2017 |
| CN | 108264727 A | 7/2018 |
| EP | 3632982 A1 | 4/2020 |
| EP | 3747936 A1 | 12/2020 |
| JP | 2010-265371 A | 11/2010 |
| JP | 2016-528361 A | 9/2016 |
| JP | 2017-002202 A | 1/2017 |
| JP | 2017-149988 A | 8/2017 |
| JP | 2017-528576 A | 9/2017 |
| JP | 2017-203108 A | 11/2017 |
| KR | 20170004903 A * | 1/2017 ............. C08L 63/00 |
| WO | 2004/048435 A1 | 6/2004 |
| WO | 2005/053372 A1 | 6/2005 |
| WO | 2016/046138 A1 | 3/2016 |
| WO | 2018/216524 A1 | 11/2018 |
| WO | 2019/151174 A1 | 8/2019 |

OTHER PUBLICATIONS

Covalent Chemical, https://www.covalentchemical.com/chemical-distributor/pentaerythritol-tetraoleate-supplier-10610.aspx, accessed Sep. 1, 2022 (Year: 2022).*
Chemical Book, https://www.chemicalbook.com/ProductChemicalPropertiesCB4677178_EN.htm, accessed Jun. 14, 2023. (Year: 2023).*
ChemBK, https://www.chembk.com/en/chem/2-Methylimidazole, accessed Jun. 15, 2023. (Year: 2023).*
Watanabe, KR 20170004903 A machine translation in English, Jan. 11, 2017. (Year: 2017).*
Database WPI Week 201855 (Jul. 10, 2018), Thomson Scientific, London, GB; AN 2018-592070, XP002804379.
Extended European Search Report issued in corresponding European Patent Application No. 19868436.7 dated Oct. 18, 2021.
Office Action issued in related Japanese Patent Application No. 2020-205361 dated Jul. 12, 2022.
International Search Report issued in related International Application No. PCT/JP2019/037237 dated Dec. 10, 2019.
Office Action issued in related Japanese Patent Application No. 2019-554943 dated Jun. 30, 2020.
Office Action issued in related Japanese Patent Application No. 2019-554943 dated Sep. 8, 2020.
Office Action issued in related Chinese Patent Application No. 201980064422.6 dated Nov. 4, 2022.
Office Action issued in related Chinese Patent Application No. 201980064422.6 dated Sep. 28, 2023.
Office Action issued in related Chinese Patent Application No. 201980064422.6 dated Apr. 29, 2023.

* cited by examiner

*Primary Examiner* — David T Karst
(74) *Attorney, Agent, or Firm* — Morgan, Lewis & Bockius LLP

(57) ABSTRACT

An object of the present invention is to provide a molding material which can suppress film lifting, gives good peelability of release paper, and can produce therefrom a fiber-reinforced composite article with good demoldability from a metal mold, and a fiber-reinforced composite article. The molding material of the present invention comprises an epoxy resin composition comprising a component (A): an epoxy resin, a component (B): an epoxy resin curing agent, and a component (C): an unsaturated fatty acid ester compound having a melting point or pour point of 25° ° C. or lower; and a reinforcing fiber substrate, wherein the reinforcing fiber substrate is impregnated with the epoxy resin composition.

17 Claims, No Drawings

MOLDING MATERIAL, FIBER-REINFORCED COMPOSITE ARTICLE AND METHOD FOR PRODUCING FIBER-REINFORCED COMPOSITE ARTICLE

The present invention relates to a molding material, a fiber-reinforced composite article, and a method for producing a fiber-reinforced composite article.

This application is a continuation application of International Application No. PCT/JP2019/037237, filed on Sep. 24, 2019, which claims the benefit of priority of the prior Japanese Patent Application No. 2018-186769, filed on Oct. 1, 2018, the content of which is incorporated herein by reference.

TECHNICAL FIELD

Background Art

A fiber-reinforced composite article containing a reinforcing fiber and a matrix resin is widely used in industrial applications such as automobiles because of good mechanical properties, and in recent years, the scope of application has been expanding more and more. As a molding material for obtaining a fiber-reinforced composite article, for example, a sheet-type prepreg in which the reinforcing fiber is impregnated with a matrix resin composition has been known. The fiber-reinforced composite article can be obtained by molding by heating and pressurizing of a prepreg laminate in which a plurality of prepregs are laminated.

As the matrix resin composition, from the viewpoint of good impregnation property and heat resistance, a thermosetting resin composition including a phenol resin, a melamine resin, a bismaleimide resin, an unsaturated polyester resin, an epoxy resin, or the like is usually used. Among these, an epoxy resin composition is widely used because a fiber-reinforced composite article having good heat resistance and moldability and having higher mechanical strength can be obtained.

Due to low curing shrinkage and high affinity for metals, an epoxy resin has poor demoldability from metal mold used in press molding, compared to other resins. Therefore, mold occupancy time is long and productivity tends to decrease. In addition, in a case of demolding the fiber-reinforced composite article which is firmly adhered to the metal mold, a load is applied to the fiber-reinforced composite article. Therefore, a mold release agent is used for molding using the epoxy resin composition.

As the mold release agent, a coating-type mold release agent (external mold release agent) which is applied to a resin contact surface of the metal mold has been known. However, in order to ensure mold release property, it is required to apply the external mold release agent to the metal mold each time of molding. Therefore, the external mold release agent has a problem that the molding cycle is long because of time and effort.

As the mold release agent, an internal adding mold release agent (internal mold release agent) of a type which is blended (internally added) in the matrix resin composition has also been known. Patent Document 1 discloses an epoxy resin composition including an internal mold release agent which has a perfluoroalkyl group and has a melting point or pour point of 25° C. or higher and 100° C. or lower.

As a molding method for shortening the molding time and reducing the molding cost, a high-cycle press molding has been known (Patent Document 2). In the high-cycle press molding, in order to enable mass production of products, a thermosetting resin composition is cured by heating at approximately 100° C. to 150° C. for a short time of approximately several minutes to several tens of minutes under high pressure. Therefore, the thermosetting resin composition used for the high-cycle press molding is required to have a fast curability enough to cure under the above-described conditions. However, since the curing time becomes short when the fast curability is increased, the internal mold release agent is difficult to sufficiently transfer to between the resin and the mold during molding, and the demoldability of the fiber-reinforced composite article from the metal mold is reduced. As described above, it is difficult to achieve both fast curability and demoldability.

Furthermore, a molding material using a continuous fiber such as prepreg has less resin flow during molding, compared to a molding material using a non-continuous fiber such as sheet molding compound (SMC). Therefore, it is more difficult for the internal mold release agent to transfer to between the resin and the mold, and the decreasing tendency of the demoldability from the metal mold is remarkable.

CITATION LIST

Patent Document

[Patent Document 1]
Japanese Unexamined Patent Application, First Publication No. 2017-203108
[Patent Document 2]
PCT International Publication No. WO2004/48435

SUMMARY OF INVENTION

Technical Problem

As a method for improving a demoldability of a molding material containing a fast-curing matrix resin composition and a continuous fiber, a method can be considered in which an internal mold release agent being liquid at room temperature is used and the internal mold release agent is bled out on a surface of the matrix resin composition in advance. Patent Document 1 discloses, as such an internal mold release agent, a liquid internal mold release agent having a perfluoroalkyl group. However, in a case of using such an internal mold release agent, a protective film provided on a surface of the molding material lifts and easily peels off.

In addition, a prepreg in the related art has a difficulty in peeling off a process paper (release paper) used in a producing step, and it sometimes takes time and effort to peel off the release paper in a molding operation. Suppression of film lifting and peelability of the release paper are contradictory performances, and it is difficult to achieve the both.

An object of the present invention is to provide a molding material which can suppress film lifting, gives good peelability of release paper, and can produce therefrom a fiber reinforced composite article with good demoldability from a metal mold; a fiber-reinforced composite article; and a method for producing the fiber-reinforced composite article.

Solution to Problem

The present invention has the following configurations.

[1] A molding material comprising:
an epoxy resin composition comprising
a component (A): an epoxy resin,
a component (B): an epoxy resin curing agent, and
a component (C): an unsaturated fatty acid ester compound having a melting point or pour point of 25° C. or lower; and
a reinforcing fiber substrate,
wherein the reinforcing fiber substrate is impregnated with the epoxy resin composition.

[2] The molding material according to [1],
wherein the unsaturated fatty acid ester compound is an oleic acid ester compound.

[3] The molding material according to [1] or [2],
wherein an average number of unsaturated fatty acid ester moieties per one molecule of the unsaturated fatty acid ester compound is 2.0 or more.

[4] The molding material according to [3],
wherein the average number of unsaturated fatty acid ester moieties per one molecule of the unsaturated fatty acid ester compound is 3.0 or more.

[5] The molding material according to any one of [1] to [4],
wherein a content of the component (C) is 0.05 to 5 parts by mass with respect to 100 parts by mass of the component (A).

[6] The molding material according to any one of [1] to [5],
wherein the component (C) is an internal mold release agent.

[7] The molding material according to any one of [1] to [6],
wherein a reinforcing fiber included in the reinforcing fiber substrate is a continuous fiber.

[8] The molding material according to any one of [1] to [7],
wherein the epoxy resin composition is curable within 7 minutes at 140° C.

[9] A fiber-reinforced composite article which is a cured product of the molding material according to any one of [1] to [8].

[10] A method for producing a fiber-reinforced composite article comprising: press-molding the molding material according to any one of [1] to [8].

Advantageous Effects of Invention

The molding material of the present invention can suppress film lifting, gives good peelability of release paper, and can produce therefrom a fiber reinforced composite article with good demoldability from the metal mold.

The fiber-reinforced composite article of the present invention has good demoldability from the metal mold.

According to the method for producing a fiber-reinforced composite article of the present invention, it is possible to produce a fiber-reinforced composite article that has good demoldability from the metal mold.

DESCRIPTION OF EMBODIMENTS

Definitions of the following terms apply throughout the present specification and the claims.

An "epoxy resin" is a compound having one or more epoxy groups in the molecule. A monofunctional epoxy resin is a compound having one epoxy group, a bifunctional epoxy resin is a compound having two epoxy groups, a trifunctional epoxy resin is a compound having three epoxy groups, and a tetrafunctional epoxy resin is a compound having four epoxy groups.

Catalog values can be applied to a "melting point" or "pour point". In a case where the catalog value is not listed, the "melting point" or "pour point" is determined to be a temperature at an intersection between the baseline and the tangent at the inflection point on the endothermic reaction start side of the lowest temperature peak due to the melting on DSC exothermic curve by differential scanning calorimetry (DSC).

A "reinforcing fiber substrate" is an aggregate of reinforcing fibers. Specific examples of the reinforcing fiber substrate include a reinforcing fiber bundle and a sheet-type article in which chopped reinforcing fiber bundles are two-dimensionally randomly stacked.

"To" used for describing a range of numerical values means that the range includes numerical values listed before and after "to" as a lower limit and an upper limit.

[Molding Material]

The molding material of the present invention is a molding material that a reinforcing fiber substrate is impregnated with an epoxy resin composition described later. In the molding material of the present invention, the epoxy resin composition refers to a component other than the reinforcing fiber substrate included in the molding material of the present invention.

Examples of the molding material include prepreg and tow prepreg. Since viscosity characteristics of the epoxy resin composition in the present invention are suitable for prepreg, prepreg in which the reinforcing fiber included in the reinforcing fiber substrate is a continuous fiber is preferable as the molding material.

(Epoxy Resin Composition)

The epoxy resin composition comprises a component (A), a component (B), and a component (C).

The epoxy resin composition contained in the molding material of the present invention is a matrix resin composition of the molding material, which is an intermediate material used in the production of the fiber-reinforced composite article, and is particularly suitable as a matrix resin composition for prepreg.

The epoxy resin composition contained in the molding material of the present invention is curable preferably within 7 minutes at 140° C., and more preferably within 5 minutes at 140° C.

The component (A) is an epoxy resin.

The epoxy resin is not particularly limited, and examples thereof include liquid epoxy resins such as a bisphenol A type epoxy resin, a bisphenol F type epoxy resin, a bisphenol S type epoxy resin, a bisphenol AD type epoxy resin, an epoxy resin having a naphthalene skeleton, an epoxy resin having an isocyanate-modified oxazolidone ring, a resorcinol type epoxy resin, a hydroquinone type epoxy resin, a catechol type epoxy resin, and a dihydroxynaphthalene type epoxy resin, a biphenyl type epoxy resin, a tetramethylbiphenyl type epoxy resin, a phenol novolac type epoxy resin, a cresol type epoxy resin, a cresol novolac type epoxy resin, a triphenylmethane type epoxy resin, a tetraphenylethane type epoxy resin, a dicyclopentadiene type epoxy resin, a dicyclopentadiene-phenol addition reaction type epoxy resin, a phenol aralkyl type epoxy resin, a naphthol novolac type epoxy resin, a naphthol aralkyl type epoxy resin, a naphthol-phenol co-condensed novolac type epoxy resin, a naphthol-cresol co-condensed novolac type epoxy resin, an aromatic hydrocarbon formaldehyde resin-modified phenol resin type epoxy resin, a biphenyl-modified novolac type epoxy resin, a tetrabromobisphenol A type epoxy resin, a brominated phenol novolac type epoxy resin, a glycidylamine type epoxy resin, a glycidyl ether type epoxy resin, and a urethane modified epoxy resin.

Among these, a bisphenol A type epoxy resin, a bisphenol F type epoxy resin, a bisphenol S type epoxy resin, a biphenyl type epoxy resin, a dicyclopentadiene type epoxy resin, an epoxy resin having a naphthalene skeleton, an epoxy resin having an isocyanate-modified oxazolidone ring, a phenol novolac type epoxy resin, a cresol type epoxy resin, a glycidylamine type epoxy resin, a glycidyl ether type epoxy resin, and modified products of these epoxy resins and brominated epoxy resins are preferable.

The bisphenol A type epoxy resin is more preferable from the viewpoint of good heat resistance and chemical resistance of the fiber-reinforced composite article. In addition, the bisphenol F type epoxy resin is more preferable from the viewpoint that the viscosity of the bisphenol F type epoxy resin is lower than that of the bisphenol A type epoxy resin having the same molecular weight and the elastic modulus of the fiber-reinforced composite article is high.

As the component (A), a bifunctional epoxy resin is preferable. A trifunctional epoxy resin or a tetrafunctional epoxy resin may be used as the component (A). By blending the trifunctional epoxy resin or the tetrafunctional epoxy resin, the heat resistance of the fiber-reinforced composite article can be further improved without impairing other physical properties.

Examples of commercially available products of the bifunctional epoxy resin include the following.

jER (registered trademark; the same applies hereinafter) 825, 827, 828, 828EL, 828US, 828XA, 806, 806H, 807, 1750, and YL6810 manufactured by Mitsubishi Chemical Corporation; EPICLON (registered trademark) 840, 840-S, 850, 850-S, EXA-850CRP, 850-LC, 830, 830-S, 835, EXA-830CRP, EXA-830LVP, and EXA-835LV manufactured by DIC Corporation; Epotohto (registered trademark) YD-127, YD-128, YD-128G, YD-128S, YD-128CA, and YDF-170 manufactured by NIPPON STEEL Chemical & Material Co., Ltd.; RE-303S-L, RE-310S, GAN, and GOT manufactured by Nippon Kayaku Co., Ltd.

Examples of commercially available products of tri- or higher functional epoxy resin include the following.

jER 152, 604, 630, and 630LSD manufactured by Mitsubishi Chemical Corporation; YH-434 and YH434L manufactured by NIPPON STEEL Chemical & Material Co., Ltd.; SUMI-EPOXY (registered trademark) ELM434, ELM100, and ELM120 manufactured by Sumitomo Chemical Company; TETRAD-X manufactured by MITSUBISHI GAS CHEMICAL COMPANY, INC.

One kind of the component (A) may be used alone, or two or more kinds thereof may be used in combination.

The content of the component (A) in the epoxy resin composition is preferably adjusted such that the viscosity of the epoxy resin composition at 30° C. is 103 to 106 Pas, depending on the kind of the component (A).

The component (B) is an epoxy resin curing agent.

The component (B) affects mechanical properties (bending strength and flexural modulus) of the fiber-reinforced composite article (cured product) produced by using the molding material of the present invention, storage stability and curing temperature and time.

As the form of the component (B), various forms such as microcapsule type and denaturation can be adopted.

One kind of the component (B) may be used alone, or two or more kinds thereof may be used in combination.

The component (B) may be any compound as long as the compound can cure the epoxy resin, and examples thereof include amine compounds, acid anhydride compounds, phenol, mercaptan, Lewis acid amine complex, boron chloride amine complexes, and imidazole compounds.

As the amine compound, dicyandiamide and a derivative of dicyandiamide are preferable from the viewpoint that the melting point is high and the compatibility with the epoxy resin is suppressed in a low-temperature region. In addition, in a case where the epoxy resin composition includes dicyandiamide and a derivative of dicyandiamide, good pot life is obtained and the mechanical properties of the fiber-reinforced composite article are improved.

Examples of the derivative of dicyandiamide include a combination of dicyandiamide and various compounds such as an epoxy resin, a vinyl compound, an acrylic compound, and 9,10-dihydro-9-oxa-10-phosphophenanthrene-10-oxide.

One kind of the derivative of dicyandiamide may be used alone, or two or more kinds thereof may be used in combination.

The derivative of dicyandiamide may be used in combination with dicyandiamide.

Among dicyandiamide and the derivatives of dicyandiamide, dicyandiamide is preferable from the viewpoint of reactivity.

As the imidazole compound, an imidazole compound in which a hydrogen atom at the 5-position of 1H-imidazole is replaced with a hydroxymethyl group and a hydrogen atom at the 2-position of 1H-imidazole is replaced with a phenyl group or a toluyl group is preferable. Specific examples thereof include 2-phenyl-4,5-bis(hydroxymethyl) imidazole, 2-phenyl-4-methyl-5-hydroxymethyl imidazole, 2-phenyl-4-benzyl-5-hydroxymethyl imidazole, 2-p-toluyl-4-methyl-5-hydroxymethyl imidazole, 2-m-toluyl-4-methyl-5-hydroxymethyl imidazole, 2-m-toluyl-4,5-bis(hydroxymethyl) imidazole, and 2-p-toluyl-4,5-bis(hydroxymethyl) imidazole.

In addition, as the imidazole compound, an imidazole compound having a triazine ring in the molecule is preferable from the viewpoint of high storage stability of the epoxy resin composition at room temperature and fast curing rate. Specific examples thereof include 2,4-diamino-6-[2-(2-methyl-1-imidazolyl)]ethyl-s-triazine.

In a case where the component (B) is solid in the epoxy resin at an ambient temperature of 25° C., the component (B) has low reactivity with the epoxy resin at 25° C. and is good in storage stability. As the component (B), from the viewpoint that both pot life and reactivity during curing can be satisfied, a compound which is solid in the epoxy resin at an ambient temperature of 25° C. and is liquid during curing is preferable, and dicyandiamide or the imidazole compound is more preferable.

The component (B) preferably comprises dicyandiamide, and it is more preferable to use dicyandiamide in combination with an imidazole compound which is solid at 25° C. The cured product cured with dicyandiamide has good adhesiveness to the reinforcing fiber. In addition, the cured product cured with the imidazole compound has good heat resistance.

In a case where the compound which is solid in the epoxy resin at an ambient temperature of 25° C. and is liquid during curing is used as the component (B), the content of the component (B) is preferably 1 to 20 parts by mass and more preferably 3 to 10 parts by mass with respect to 100 parts by mass of the component (A). In a case where the content of the component (B) is 1 part by mass or more, more preferably 3 parts by mass or more, a sufficient curing rate is obtained. In a case where the content of the component (B) is 20 parts by mass or less, more preferably 10 parts by mass or less, water absorption rate of the fiber-reinforced composite article is suppressed, and heat resistance of the fiber-reinforced composite article is unlikely to decrease.

The component (C) is an unsaturated fatty acid ester compound having a melting point or pour point of 25° ° C. or lower.

The component (C) is a component that improves demoldability of the fiber-reinforced composite article, which is obtained by heat-press molding the molding material of the present invention, from the metal mold, and the component (C) has a function as an internal mold release agent.

In a case of molding the molding material, the epoxy resin included in the molding material is cured in the metal mold. Since the epoxy resin has high adhesiveness to metal, the cured product of the epoxy resin tends to adhere to the metal mold as well. By using the internal mold release agent, it is possible to reduce the adhesion between the metal mold and the cured product of the epoxy resin at the time of demolding. Since the epoxy resin has the property of becoming low in viscosity and flowing once before being cured in the process of heat-press molding, in a case where an external mold release agent is used to improve the demoldability, the mold release agent may flow out of the system due to the influence of the resin flow. The component (C) transfers to the interface between the metal mold and the fiber-reinforced composite article during heat-press molding, and does not flow out of the system due to the resin flow during heat-press molding.

The component (C) is preferably liquid at room temperature (or storage temperature of the prepreg). The melting point or pour point of the component (C) is 25° C. or lower, and is preferably 20° ° C. or lower, more preferably 10° C. or lower, and still more preferably 5° C. or lower. In addition, the melting point or pour point of the component (C) is preferably −50° C. or higher and more preferably −40° C. or higher. In a case where the melting point or pour point of the component (C) is within the above-described range, the component (C) tends to bleed out easily on the surface of the resin composition. Therefore, during heat-press molding, the component (C) easily transfers to the interface between the metal mold and the fiber-reinforced composite article, and a fiber-reinforced composite article having good demoldability from the metal mold can be obtained.

In addition, the component (C) is an unsaturated fatty acid ester compound. By using an unsaturated fatty acid ester compound as the component (C) as an internal mold release agent, even in a case where the component (C) bleeds out on the surface of the resin composition, it is possible to suppress the lifting and peeling of the film provided on the surface of the molding material. Therefore, it is possible to achieve both good peelability of release paper and demoldability, and suppression of lifting peeling of the film.

Examples of the unsaturated fatty acid ester compound include ester compounds of an unsaturated fatty acid and an aliphatic alcohol and ester compounds of an unsaturated fatty acid and a polyhydric alcohol.

As the unsaturated fatty acid, an unsaturated fatty acid having an alkenyl group with 5 to 40 carbon atoms and having one or more unsaturated bonds is preferable, an unsaturated fatty acid having an alkenyl group with 10 to 30 carbon atoms and having one or more unsaturated bonds is more preferable, and an unsaturated fatty acid having an alkenyl group with 12 to 20 carbon atoms and having one or more unsaturated bonds is still more preferable. In a case where the number of carbon atoms of the alkenyl group in the unsaturated fatty acid is 5 or more, more preferably 10 or more, still more preferably 12 or more, good demoldability is easily obtained. In a case where the number of carbon atoms of an alkenyl group having an unsaturated bond in the unsaturated fatty acid is 40 or less, more preferably 30 or less, still more preferably 20 or less, the melting point or pour point is 25° C. or lower and it is easy to bleed out to the surface of the epoxy resin composition even at room temperature.

As the unsaturated fatty acid, oleic acid, linoleic acid, linolenic acid, arachidonic acid, eicosapentaenoic acid, docosahexaenoic acid, or sorbic acid is preferable. Oleic acid, linoleic acid, linolenic acid, arachidonic acid, eicosapentaenoic acid, and docosahexaenoic acid, which have a cis-type alkenyl group, are still more preferable from the viewpoint of being easily available and low melting point.

As the unsaturated fatty acid, oleic acid is particularly preferable. That is, as the unsaturated fatty acid ester compound, an oleic acid ester compound is particularly preferable.

As the aliphatic alcohol, an aliphatic alcohol having an alkyl group with 1 to 100 carbon atoms is preferable, an aliphatic alcohol having an alkyl group with 2 to 60 carbon atoms is more preferable, an aliphatic alcohol having an alkyl group with 3 to 40 carbon atoms is still more preferable, an aliphatic alcohol having an alkyl group with 4 to 30 carbon atoms is particularly preferable, and an aliphatic alcohol having an alkyl group with 5 to 20 carbon atoms is most preferable. In a case where the number of carbon atoms of the alkyl group of the aliphatic alcohol is 1 or more, more preferably 2 or more, still more preferably 3 or more, particularly preferably 4 or more, most preferably 5 or more, good demoldability is easily obtained. In a case where the number of carbon atoms of the alkyl group of the aliphatic alcohol is 100 or less, more preferably 60 or less, still more preferably 40 or less, particularly preferably 30 or less, most preferably 20 or less, the melting point or pour point is 25° C. or lower and the unsaturated fatty acid ester compound is easy to bleed out to the surface of the epoxy resin composition even at room temperature. In the aliphatic alcohol, some carbon-carbon bonds of the alkyl group may be replaced with unsaturated bonds.

As the aliphatic alcohol, methyl alcohol, isopropyl alcohol, n-butyl alcohol, isobutyl alcohol, n-octyl alcohol, 2-ethylhexyl alcohol, n-decyl alcohol, isodecyl alcohol, lauryl alcohol, isotridecyl alcohol, myristyl alcohol, cetyl alcohol, stearyl alcohol, or octyldodecyl alcohol is preferable.

The polyhydric alcohol is a compound having two or more hydroxyl groups in the molecule, and is preferably a compound having three or more hydroxyl groups in the molecule. In a case where the number of hydroxyl groups in the polyhydric alcohol is at least the above-described lower limit value, since many ester bonds can be formed with the unsaturated fatty acid, demoldability is likely to be improved.

As the polyhydric alcohol, glycerin, sorbitan, polyoxyethylene sorbitan, polyoxyethylene sorbitol, ethylene glycol, polyethylene glycol, propylene glycol, pentaerythritol, or polyoxyethylene bisphenol A is preferable.

When alkenyl groups having unsaturated bonds are present in high concentration on the surface of the fiber-reinforced composite article, the demoldability from the metal mold tends to be improved. Accordingly, the average number of unsaturated fatty acid ester moieties (moieties derived from the unsaturated fatty acid) per one molecule of the unsaturated fatty acid ester compound of the component (C) is preferably 2.0 or more and more preferably 3.0 or more. The average number of unsaturated fatty acid ester moieties per one molecule of the unsaturated fatty acid ester compound of the component (C) is not particularly limited, and can be, for example, 5.0 or less. In a case where the average number of unsaturated fatty acid ester moieties per one molecule of the unsaturated fatty acid ester compound of the component (C) is 5.0 or less, water absorbency of the obtained fiber-reinforced composite article is not increased, which is preferable.

The average number of the unsaturated fatty acid ester moieties is the number of ester moieties of the unsaturated fatty acid ester compound in a case where one kind of unsaturated fatty acid ester compound is used alone, and can be obtained by analysis in a case where a mixture of two or more unsaturated fatty acid ester compounds is used. For example, it can be calculated by comparing the number of protons by NMR measurement of the unsaturated fatty acid ester compound. In addition, it can be analyzed after decomposing the unsaturated fatty acid ester compound by hydrolysis into the unsaturated fatty acid and the aliphatic alcohol or the polyhydric alcohol.

Examples of the unsaturated fatty acid ester compound having two or more ester moieties in one molecule include sorbitan triolate, polyoxyethylene sorbitan triolate, polyoxyethylene sorbitan tetraolate, and polyoxyethylene sorbitol tetraolate.

The content of the component (C) in the epoxy resin composition is preferably 0.05 to 5 parts by mass, more preferably 0.1 to 3 parts by mass, still more preferably 0.15 to 2 parts by mass, and particularly preferably 0.2 to 1 part by mass with respect to 100 parts by mass of the component (A). In a case where the content of the component (C) with respect to 100 parts by mass of the component (A) is 0.05 parts by mass or more, more preferably 0.1 parts by mass or more, still more preferably 0.15 parts by mass or more, and particularly preferably 0.2 or more, the demoldability of the fiber-reinforced composite article from the metal mold is better, and both the heat resistance and mechanical properties of the fiber-reinforced composite article are likely to be satisfactory. In a case where a large amount of the component (C), which does not react with the epoxy group, is included, since the heat resistance and mechanical properties of the obtained fiber-reinforced composite article are easily impaired, it is preferable to add the component (C) in as little as possible within the range in which sufficient demoldability can be obtained. That is, the content of the component (C) with respect to 100 parts by mass of the component (A) is preferably 5 parts by mass or less, more preferably 3 parts by mass or less, still more preferably 2 parts by mass or less, and particularly preferably 1 part by mass or less.

The epoxy resin composition may further contain other components in addition to the component (A), the component (B), and the component (C) as necessary, as long as the effects of the present invention are not impaired.

Examples of other components include a curing accelerator, an inorganic filler, an organic pigment, and an inorganic pigment.

By using the component (B) in combination with an appropriate curing accelerator, the reaction starting temperature can be lowered without significantly impairing the storage stability, and the molding material can be cured in a short time. In addition, the mechanical properties (bending strength and flexural modulus) and thermal properties (heat resistance) of the fiber-reinforced composite article can also be improved.

As the curing accelerator, a urea compound is preferable from the viewpoint of increasing the mechanical properties (bending strength and flexural modulus) of the fiber-reinforced composite article. Examples of the urea compound include 3-phenyl-1,1-dimethylurea, 3-(3,4-dichlorophenyl)-1,1-dimethylurea, 3-(3-chloro-4-methylphenyl)-1,1-dimethylurea, 2,4-bis(3,3-dimethylureido)toluene, and 1,1'-(4-methyl-1,3-phenylene)bis(3,3-dimethylurea).

Examples of the inorganic filler include calcium carbonate, aluminum hydroxide, clay, barium sulfate, magnesium oxide, glass powder, hollow glass beads, and AEROSIL (registered trademark).

The viscosity of the epoxy resin composition at 30° C. is preferably 103 to 106 Pa's and more preferably 104 to 105 Pa·s. In a case where the viscosity of the epoxy resin composition at 30° C. is within the above-described range, tackiness and drapeability of the molding material can be well maintained.

The viscosity of the epoxy resin composition is a value measured by a rheometer under the following conditions.

Plate used: 25 parallel plate
Plate gap: 0.5 mm
Measurement frequency: 10 rad/sec
Stress: 300 Pa The epoxy resin composition can be prepared by a known method in the related art, except that the component (A), the component (B), the component (C), and if necessary other components are used. For example, the epoxy resin composition may be prepared by mixing each component at the same time, or may be prepared by preparing a masterbatch in which the component (B), the component (C), or the like are appropriately dispersed in the component (A) in advance and using the masterbatch. In addition, in a case where the temperature inside the system rises due to shearing heat generated by kneading and the like, it is preferable to take measures such as adjusting the kneading speed and cooling kneading pot with water so as not to raise the temperature during kneading.

Examples of the kneading device include a raft machine, an attritor, a planetary mixer, a dissolver, a triple roll, a kneader, a universal stirrer, a homogenizer, a homo dispenser, a ball mill, and a bead mill. Two or more kinds of kneading devices may be used in combination.

(Reinforcing Fiber Substrate)

As the reinforcing fiber constituting the reinforcing fiber substrate, various fibers can be adopted depending on the application and purpose of use of the molding material, and examples thereof include carbon fiber (including graphite fiber; the same applies hereinafter), aramid fiber, silicon carbide fiber, alumina fiber, boron fiber, tungsten carbide fiber, and glass fiber. From the viewpoint of the mechanical properties of the fiber-reinforced composite article, carbon fiber or glass fiber is preferable, and carbon fiber is particularly preferable.

As the carbon fiber, a high-strength carbon fiber having a tensile elongation of 1.5% or more is preferable from the viewpoint of developing the strength of the fiber-reinforced composite article.

The form of the reinforcing fiber substrate is not particularly limited, and examples thereof include woven fabrics, non-woven fabrics, sheet-type forms in which continuous fibers are aligned in one direction, and short fibers (bundles) prepared by cutting continuous fibers to a certain length.

For example, in a case where the molding material is prepreg, examples of the form of the reinforcing fiber substrate include sheet-type forms in which continuous fibers are aligned in one direction; forms made of continuous fibers as a woven fabric; forms in which tows are aligned in one direction and held by weft threads (auxiliary threads); forms of multi-axial warp knit made by stacking multiple sheets of reinforcing fibers in which continuous fibers are aligned in one direction and fastening the multiple sheets with auxiliary threads so that the fiber directions are different from each other; and non-woven fabrics. Among these, from the viewpoint that the prepreg is easy to produce, the form of the reinforcing fiber substrate is preferable sheet-type forms in which continuous fibers are aligned in one direction; forms made of continuous fibers as a woven fabric; forms in which tows are aligned in one direction and held by weft threads (auxiliary threads); and forms of multi-axial warp knit made by stacking multiple sheets of reinforcing fibers in which continuous fibers are aligned in one direction and fastening the multiple sheets with auxiliary threads so that the fiber directions are different from each other. From the viewpoint of developing the strength of the obtained fiber-reinforced composite article, a sheet-type form in which continuous fibers are aligned in one direction is still more preferable.

In a case where the prepreg is produced using the sheet-type reinforcing fiber substrate in which continuous fibers are aligned in one direction, in many cases, the resin composition is not allowed to flow much during molding so that the reinforcing fibers can be maintained in a unidirectionally aligned state even after molding. In this case, since the internal mold release agent is difficult to come out between the mold and the matrix resin composition, it necessarily bleeds out to the surface of the prepreg in advance in a state of the prepreg. In the present invention, since the epoxy resin composition containing the component (C) is used, the component (C) bleeds out in advance before molding, and the demoldability at the time of molding is improved.

The basis weight of the reinforcing fiber substrate can be freely set according to the purpose of use (application) of the fiber-reinforced composite article, and practically, it is preferably to be 50 g/m² or more and 2000 g/m² or less. From the viewpoint that it is easy to obtain a prepreg with good impregnation with the epoxy resin composition, the basis weight of the reinforcing fiber substrate is more preferably 50 g/m² or more and 600 g/m² or less and still more preferably 50 g/m² or more and 300 g/m² or less.

(Method for Producing Molding Material)

The molding material of the present invention can be produced by impregnating the reinforcing fiber substrate with the above-described epoxy resin composition by a known method.

For example, a predetermined amount of the epoxy resin composition is applied to the surface of a release paper or the like, the reinforcing fiber substrate is supplied to the surface thereof, and then a pressing roll is passed to impregnate the reinforcing fiber substrate with the epoxy resin composition, thereby obtaining a molding material. In addition, a predetermined amount of the epoxy resin composition is applied to the reinforcing fiber substrate, the reinforcing fiber substrate is sandwiched between release papers if necessary, and then a pressing roll is passed to impregnate the reinforcing fiber substrate with the epoxy resin composition, thereby obtaining a molding material.

[Fiber-Reinforced Composite Article]

The fiber-reinforced composite article of the present invention is a cured product of the molding material of the present invention. The fiber-reinforced composite article can be produced by curing by heating and pressurizing of the molding material of the present invention.

Examples of a method for producing the fiber-reinforced composite article using the molding material of the present invention include methods such as autoclave molding, vacuum bag molding, and press molding. Among these, from the viewpoint of obtaining a high-productivity and high-quality fiber-reinforced composite article by utilizing the characteristics of the epoxy resin composition used in the molding material of the present invention, it is preferable to produce the fiber-reinforced composite article by press-molding (heat-press molding) the molding material of the present invention. In a case where the fiber-reinforced composite article is produced by press molding, it is preferable to carry out a step of heating and pressurizing a preform using, as the molding material of the present invention, a prepreg or a prepreg laminate in which prepregs are laminated between molding dies adjusted to a molding temperature in advance.

The molding temperature (temperature in the metal mold) during press molding is preferably 100° C. to 150° C. and more preferably 130° ° C. to 150° C. In a case where the molding temperature is within the above-described range, a fiber-reinforced composite article having high storage stability and dimensional stability is obtained.

In the press molding, it is preferable to heat the molding material or the preform thereof under the conditions of the above-described molding temperature and pressure of 1 to 15 MPa for 1 to 20 minutes to cure the epoxy resin composition for molding. The molding time is more preferably 10 minutes or less and still more preferably 5 minutes or less. In a case where the molding time is the above-described upper limit value or less, the molding cycle is high.

In a case of producing the fiber-reinforced composite article by the press molding under the above-described conditions, it is preferable that the glass transition temperature of the fiber-reinforced composite article after curing, particularly G'-Tg determined as the temperature at which the storage rigidity (G') starts to decrease, is higher than the temperature in the metal mold at the time of molding. The fiber-reinforced composite article is thereby prevented from being deformed when being taken out from the metal mold after the press molding. For example, G'-Tg of the fiber-reinforced composite article produced by pressurizing a prepreg comprising a reinforcing fiber substrate impregnated with a epoxy resin composition between molding dies preheated to 140° C. at 1 MPa for 5 minutes of holding time is preferably 150° C. or higher. When a storage rigidity (G') is measured by dynamic viscoelasticity measurement using a rheometer at a measurement frequency of 1 Hz and a heating rate of 5° C./min and log G' is then plotted against temperature to make a log G'-temperature diagram, G'-Tg is a temperature at an intersection between an approximate straight line in a region where log G' is flat and an approximate straight line in a region where log G' decreases sharply in the log G'-temperature diagram. G'-Tg is a glass transition temperature obtained by measuring the dynamic viscoelasticity of the cured product.

The application of the fiber-reinforced composite article obtained by using the molding material of the present invention is not particularly limited, and examples thereof include structural materials for aircrafts, vehicles such as automobiles and ships, structural materials for buildings and the like, sports equipment such as golf shafts, fishing rods and tennis rackets, and general industrial products such as windmills and rolls.

As described above, in the molding material of the present invention, the reinforcing fiber substrate is impregnated with the epoxy resin composition comprising the component (A), the component (B), and the component (C). Therefore, although the component (A): epoxy resin having high adhesiveness to the metal mold is contained, it is possible to suppress the film lifting, and obtain good peelability of the release paper and good demoldability of the fiber-reinforced composite article from the metal mold. In addition, in a case of using the molding material of the present invention, the fiber-reinforced composite article, which is a cured material, has good mechanical properties and heat resistance, the surface appearance of the fiber-reinforced composite article is not impaired, and contamination of metal mold is also very small.

The present invention is not limited to the above-described embodiment, and various modifications can be made within the scope of the matters described in the claims. The technical scope of the present invention also includes embodiments obtained by appropriately combining the technical means shown in the above-described embodiments with different embodiments.

EXAMPLES

Hereinafter, the present invention will be specifically described with reference to Examples, but the present invention is not limited to the following description.

Each component used in the present example is shown below.

(Component (A))

jER 828: bisphenol A type epoxy resin (product name "jER 828", epoxy equivalent: 189, manufactured by Mitsubishi Chemical Corporation)

YD-952: oxazoridone ring-containing epoxy resin (product name "YD-952", epoxy equivalent: 336, manufactured by NIPPON STEEL Chemical & Material Co., Ltd.)

N-740: phenol novolac type epoxy resin (product name "N-740", epoxy equivalent: 182, manufactured by DIC Corporation)

(Component (B))

1400F: dicyandiamide (product name "Dicyanex 1400F", manufactured by Air Products and Chemicals, Inc.)

2MZA-PW: 2,4-diamino-6-(2'-methylimidazolyl-(1'))-ethyl-s-triazine (product name "Curezol (registered trademark) 2MZA-PW", manufactured by SHIKOKU CHEMICALS CORPORATION)

(Component (C))

BYK (registered trademark; the same applies hereinafter)-P9912 (product name "BYK-P9912", manufactured by BYK Chemie Japan, melting point: −27° C., average number of unsaturated fatty acid (oleic acid) ester moieties: 2.2)

SP-O30V: sorbitan triolate (product name "RHEODOL (registered trademark; the same applies hereinafter) SP-O30V", manufactured by Kao Corporation, melting point: −23° ° C., average number of unsaturated fatty acid (oleic acid) ester moieties: 3.0)

430V: polyoxyethylene (30) sorbitol tetraolate (product name "RHEODOL 430V", manufactured by Kao Corporation, melting point: −7° C., average number of unsaturated fatty acid (oleic acid) ester moieties: 4.0)

440V: polyoxyethylene (40) sorbitol tetraolate (product name "RHEODOL 440V", manufactured by Kao Corporation, melting point: 2° ° C., average number of unsaturated fatty acid (oleic acid) ester moieties: 4.0)

TW-O320V: polyoxyethylene (20) sorbitan triolate (product name "RHEODOL TW-O320V", manufactured by Kao Corporation, melting point: −20° C., average number of unsaturated fatty acid (oleic acid) ester moieties: 3.0)

PE-MO: pentaerythritol monooleate (product name "EXCEPARL (registered trademark; the same applies hereinafter) PE-MO", manufactured by Kao Corporation, melting point: −29° C., average number of unsaturated fatty acid (oleic acid) ester moieties: 1.0)

DAO-7S: polyglycerin fatty acid ester (product name "DAO-7S", manufactured by Sakamoto Yakuhin kogyo Co., Ltd., melting point: 25° C. or lower (liquid at 25° C.), average number of unsaturated fatty acid (oleic acid) ester moieties: 10.0)

Butyl oleate: butyl oleate (product name "Butyl oleate", manufactured by FUJIFILM Wako Pure Chemical Corporation, melting point: −55° C., average number of unsaturated fatty acid (oleic acid) ester moieties: 1.0)

(Other Internal Mold Release Agents)

TW-S320V: polyoxyethylene (20) sorbitan tristearate (product name "RHEODOL TW-S320V", manufactured by Kao Corporation, melting point: 33° C.).

PE-MS-P: pentaerythritol monostearate (product name "EXCEPARL PE-MS-P", manufactured by Kao Corporation, melting point: 52° C.)

O-95R: monoglyceride oleic acid (product name "EXCEL (registered trademark)O-95R", manufactured by Kao Corporation, melting point: 41° C., average number of unsaturated fatty acid (oleic acid) ester moieties: 1.0)

The melting points of BYK-P9912 and PE-MO were measured using a DSC device (manufactured by TA Instruments, Q1000).

The test substance was weighed into a standard aluminum hermetic pan of a device, and a sample was produced by covering the device with a standard aluminum lid of the device. The temperature was raised from 30° C. to 300° C. at 10° C./min to obtain a DSC exothermic curve. The melting point was determined to be a temperature at an intersection between the baseline and the tangent at the inflection point on the endothermic reaction start side of the lowest temperature peak due to the melting on the DSC exothermic curve.

The melting points of the component (C) other than BYK-P9912 and PE-MO and other internal mold release agents are catalog values.

(Reinforcing Fiber)

Carbon fiber bundle X-1: product name "TR 50S15L", manufactured by Mitsubishi Chemical Corporation, tensile strength: 4.9 GPa, tensile elastic modulus: 235 GPa, tensile elongation: 2.09%, number of filaments: 15,000, basis weight: 1.00 g/m$^2$ Example 1

1400F and 2MZA-PW as the component (B) and jER 828 as the component (A) were mixed at a mass ratio of 2:5:10, and the mixture was kneaded with a triple roll to obtain a curing agent masterbatch. Next, a mixture of jER 828, YD-952, and N-740 as the component (A) was melted at 100° C. so as to have composition shown in Table 2, and the above-described curing agent masterbatch and BYK-P9912 were added thereto at 60° C. Thereafter, the mixture was kneaded using a three-one motor to obtain an epoxy resin composition.

Using a multicoater (manufactured by HIRANO TECSEED CO., Ltd., M-500), the obtained epoxy resin composition was applied on a release paper at 60° C. to obtain two resin films. The carbon fiber bundle X-1 was wound around the resin-coated surface of one resin film by drum winding, and the other resin film was overlapped so as to sandwich the carbon fiber bundle X-1, thereby impregnating the carbon fiber bundle X-1 with the epoxy resin composition. The release paper of the resin film on one side was peeled off, and a polyethylene film (protective film) was attached thereto to obtain a unidirectional prepreg. The basis weight of the carbon fiber bundle in the obtained unidirectional prepreg was 250 g/m$^2$, and the resin content was 30.0% by mass.

The obtained unidirectional prepreg was cut to a size of 298 mm (parallel to the fiber)×298 mm (orthogonal to the fiber), and the release paper and the protective film were peeled off. Thereafter, five prepregs were laminated such that the fiber directions of the vertically adjacent unidirectional prepregs were orthogonal to each other to obtain a prepreg laminate.

After washing the surface of the metal mold, the prepreg laminate was placed in the metal mold heated to 140° C., and press molding was performed under the conditions of a surface pressure of 4 MPa applied to the prepreg laminate, a molding temperature of 140° C., and a molding time of 5 minutes, thereby obtaining a flat fiber-reinforced composite article.

Examples 2 to 12 and Comparative Examples 1 to 3

An epoxy resin composition was prepared in the same manner as in Example 1, except that compositions were changed as shown in Tables 1 and 2, and a unidirectional prepreg was produced. In addition, a prepreg laminate was produced in the same manner as in Example 1 to obtain a fiber-reinforced composite article.

[Evaluation Method]

The epoxy resin compositions and unidirectional prepregs of each example were evaluated by the following methods.

(Releasability of Epoxy Resin Composition)

Epoxy resin compositions were placed on 5 points on an aluminum plate having a thickness of 0.5 mm in an amount of 15 mg each, and cured by placing in an oven at 140° C. for 5 minutes. Before taking out from the oven, the cured product was repelled with a toothpick, the number of cured products peeled off from the aluminum plate was counted, and the evaluation was made according to the following criteria.

A: number of peeled cured products was 5.
B: number of peeled cured products was 3 or 4.
C: number of peeled cured products was 2 or less.

(Lifting and Peeling of Film)

The peeling of the polyethylene film on the surface in a case where the unidirectional prepreg was cut to a size of 298 mm (parallel to the fiber)×298 mm (orthogonal to the fiber) was evaluated according to the following criteria.

A: upon cutting, the polyethylene film on the surface of the prepreg did not peel off.
B: upon cutting, the polyethylene film on the surface of the prepreg was peeled off at a part of the end.
C: upon cutting, the polyethylene film on the surface of the prepreg was peeled off as a whole.

(Peelability of Release Paper)

The peelability of the release paper at the time of laminating the unidirectional prepregs was evaluated according to the following criteria.

A: release paper could be easily peeled off from the prepreg.
B: release paper was peeled off from the prepreg by picking up the release paper with tweezers.

(Evaluation of Demoldability)

In each example, in taking out the fiber-reinforced composite article from the metal mold, a suction cup (manufactured by YAMAOKA ENTERPRISE, suction cup 2 fingers) was brought into close contact with the surface of the fiber-reinforced composite article, and the fiber-reinforced composite article was manually pulled up in the vertical direction to be demolded. In a case where the fiber-reinforced composite article could not be demolded with the suction cup, the fiber-reinforced composite article was demolded by pushing the fiber-reinforced composite article up with a hydraulic ejector pin. Demoldability was evaluated according to the following criteria.

A: fiber-reinforced composite article was easily demolded with the suction cup.
B: fiber-reinforced composite article could not be demolded with the suction cup and was demolded with a hydraulic ejector pin.

Tables 1 and 2 show compositions of the epoxy resin composition of each example and the evaluation results.

TABLE 1

| | | Example | | | | | | | | Comparative Example | |
|---|---|---|---|---|---|---|---|---|---|---|---|
| | | 1 | 2 | 3 | 4 | 5 | 6 | 7 | 8 | 1 | 2 |
| Component (A) [parts by mass] | jER 828 | 27.5 | 27.5 | 27.5 | 27.5 | 27.5 | 27.5 | 27.5 | 27.5 | 27.5 | 27.5 |
| | YD-952 | 42.5 | 42.5 | 42.5 | 42.5 | 42.5 | 42.5 | 42.5 | 42.5 | 42.5 | 42.5 |
| | N-740 | 30 | 30 | 30 | 30 | 30 | 30 | 30 | 30 | 30 | 30 |
| Component (B) [parts by mass] | 1400F | 2 | 2 | 2 | 2 | 2 | 2 | 2 | 2 | 2 | 2 |
| | 2MZA-PW | 5 | 5 | 5 | 5 | 5 | 5 | 5 | 5 | 5 | 5 |
| Component (C) [parts by mass] | BYK-P9912 | 1 | | | | | | 0.25 | | | |
| | SP-O30V | | 1 | | | | | | 0.25 | | |
| | 430V | | | 1 | | | | | | | |
| | 440V | | | | 1 | | | | | | |
| | TW-O320V | | | | | 1 | | | | | |
| | PE-MO | | | | | | 1 | | | | |
| | DAO-7S | | | | | | | | | | |
| | Butyl oleate | | | | | | | | | | |

TABLE 1-continued

|  |  | Example | | | | | | | | Comparative Example | |
|---|---|---|---|---|---|---|---|---|---|---|---|
|  |  | 1 | 2 | 3 | 4 | 5 | 6 | 7 | 8 | 1 | 2 |
| Melting point of component (C) [° C.] | | −27 | −23 | −7.4 | 2.1 | −20 | −29 | −27 | −23 | | |
| Average number of oleic acid ester moieties in one molecule of component (C) [number] | | 2.2 | 3.0 | 4.0 | 4.0 | 3.0 | 1.0 | 2.2 | 3.0 | — | — |
| Other internal mold release agents [parts by mass] | TW-S320V | | | | | | | | | 1 | |
| | PE-MS-P | | | | | | | | | | 1 |
| | O-95R | | | | | | | | | | |
| Melting point of other internal mold release agents [° C.] | | | | | | | | | | 33 | 52 |
| Releasability of epoxy resin composition | | A | A | A | A | A | B | A | A | A | C |
| Lifting and peeling of film | | A | A | A | A | A | A | A | A | A | A |
| Peelability of release paper | | A | A | A | A | A | A | A | A | B | B |
| Demoldability | | A | A | A | A | A | A | A | A | A | B |

TABLE 2

|  |  | Example | | | | Comparative Example |
|---|---|---|---|---|---|---|
|  |  | 9 | 10 | 11 | 12 | 3 |
| Component (A) [parts by mass] | jER 828 | 27.5 | 27.5 | 27.5 | 27.5 | 27.5 |
| | YD-952 | 42.5 | 42.5 | 42.5 | 42.5 | 42.5 |
| | N-740 | 30 | 30 | 30 | 30 | 30 |
| Component (B) [parts by mass] | 1400F | 2 | 2 | 2 | 2 | 2 |
| | 2MZA-PW | 5 | 5 | 5 | 5 | 5 |
| Component (C) [parts by mass] | BYK-P9912 | | | | | |
| | SP-O30V | | | 3 | 4 | |
| | 430V | | | | | |
| | 440V | | | | | |
| | TW-O320V | | | | | |
| | PE-MO | | | | | |
| | DAO-7S | 1 | | | | |
| | Butyl oleate | | 1 | | | |
| Melting point of component (C) [° C.] | | <25 | −55 | −23 | −23 | |
| Average number of oleic acid ester moieties in one molecule of component (C) [number] | | 10.0 | 1.0 | 3.0 | 3.0 | 1.0 |
| Other internal mold release agents [parts by mass] | TW-S320V | | | | | |
| | PE-MS-P | | | | | |
| | O-95R | | | | | 1 |
| Melting point of other internal mold release agents [° C.] | | | | | | 41 |
| Releasability of epoxy resin composition | | B | B | A | A | B |
| Lifting and peeling of film | | B | A | B | B | A |
| Peelability of release paper | | A | A | A | A | B |

As shown in Table 1, in Examples 1 to 8 using the epoxy resin composition containing the component (A), the component (B), and the component (C), in addition to suppressing the peeling of the polyethylene film from the unidirectional prepreg, the releasability of the cured product of the epoxy resin composition, the peelability of the release paper from the unidirectional prepreg, and the demoldability of the fiber-reinforced composite article from the metal mold were good.

On the other hand, in Comparative Examples 1 and 2 in which an internal mold release agent having a melting point or pour point of higher than 25° C. was used instead of the component (C), one or more of the releasability of the cured product of the epoxy resin composition, the peelability of the release paper from the unidirectional prepreg, and the demoldability of the fiber-reinforced composite article from the metal mold were inferior.

In addition, as shown in Table 2, in Examples 9 to 12 using the epoxy resin composition containing the component (A), the component (B), and the component (C), in addition to suppressing the peeling of the polyethylene film from the unidirectional prepreg, the releasability of the cured product of the epoxy resin composition and the peelability of the release paper from the unidirectional prepreg were good.

On the other hand, in Comparative Example 3 in which an internal mold release agent having a melting point or pour point of higher than 25° C. was used instead of the component (C), the releasability of the epoxy resin composition and the peelability of the release paper from the unidirectional prepreg were inferior.

INDUSTRIAL APPLICABILITY

The molding material of the present invention can suppress film lifting, gives good peelability of release paper, and can produce therefrom a fiber reinforced composite article with good demoldability from the metal mold.

The fiber-reinforced composite article of the present invention has good demoldability from the metal mold.

According to the method for producing a fiber-reinforced composite article of the present invention, it is possible to produce a fiber-reinforced composite article that has good demoldability from the metal mold.

The invention claimed is:

1. A molding material comprising a reinforcing fiber substrate impregnated with an epoxy resin composition consisting essentially of:
an epoxy resin,
an epoxy resin curing agent, and
an unsaturated fatty acid ester compound having a melting point or pour point of 25° C. or lower,
wherein an average number of ester moieties of an unsaturated fatty acid per molecule of the unsaturated fatty acid ester compound is 4.0 or more, and
the epoxy resin curing agent comprises a dicyandiamide compound and excludes an acid anhydride compound.

2. The molding material according to claim 1, wherein the unsaturated fatty acid ester compound comprises an oleic acid ester compound.

3. The molding material according to claim 1, wherein a content of the unsaturated fatty acid ester compound is from 0.05 to 5 parts by mass with respect to 100 parts by mass of the epoxy resin.

4. The molding material according to claim 1, wherein the unsaturated fatty acid ester compound comprises an internal mold release agent.

5. The molding material according to claim 1, wherein a reinforcing fiber in the reinforcing fiber substrate is a continuous fiber.

6. The molding material according to claim 1, wherein the epoxy resin composition is curable within 7 minutes at 140° C.

7. The molding material according to claim 1, wherein the epoxy resin composition is curable within 5 minutes at 140° C.

8. The molding material according to claim 1, wherein the epoxy resin comprises a bisphenol A type epoxy resin, a bisphenol F type epoxy resin, a bisphenol S type epoxy resin, a biphenyl epoxy resin, a dicyclopentadiene epoxy resin, an epoxy resin having a naphthalene skeleton, an epoxy resin having an isocyanate denatured oxazoridone ring, a phenol novolac epoxy resin, a cresol epoxy resin, a glycidyl amine epoxy resin, a glycidyl ether epoxy resin, a degenerated epoxy resin thereof, or a brominated epoxy resin thereof.

9. The molding material according to claim 1, wherein the curing agent for epoxy resin further comprises an amine compound, a phenol compound, a mercaptan compound, a Lewis acid amine complex, a boron chloride amine complex, or an imidazole compound.

10. The molding material according to claim 1, wherein the unsaturated fatty acid ester compound has 5° C. or less of a melting point or a pour point.

11. The molding material according to claim 1, wherein the unsaturated fatty acid ester compound comprises an ester compound of an unsaturated fatty acid with an aliphatic alcohol or an ester compound of an unsaturated fatty acid with a multivalent alcohol.

12. A fiber-reinforced composite article prepared by curing the molding material according to claim 1.

13. The reinforcing fiber composite article according to claim 12, wherein the reinforcing fiber composite article is a molded article.

14. A method for preparing a fiber-reinforced composite article comprising: press-molding the molding material according to claim 1.

15. The molding material according to claim 1, wherein the epoxy resin curing agent further comprises an imidazole compound which is solid at 25° C.

16. The molding material according to claim 1, wherein a content of the epoxy resin curing agent is 1 to 20 parts by mass with respect to 100 parts by mass of the epoxy resin.

17. The molding material according to claim 1, wherein the epoxy resin composition further comprises an inorganic filler selected from the group consisting of calcium carbonate, aluminum hydroxide, clay, barium sulfate, magnesium oxide, glass powder, and hollow glass beads.

* * * * *